United States Patent [19]

Eldridge

[11] 4,173,692
[45] Nov. 6, 1979

[54] METHOD FOR PREPARING URETHANE-MODIFIED ISOCYANURATE FOAMS

[75] Inventor: William J. Eldridge, Berkeley Heights, N.J.

[73] Assignee: M&T Chemicals Inc., Stamford, Conn.

[21] Appl. No.: 954,447

[22] Filed: Oct. 25, 1978

Related U.S. Application Data

[63] Continuation-in-part of Ser. No. 797,445, May 16, 1977, abandoned, which is a continuation of Ser. No. 613,964, Sep. 16, 1975, abandoned.

[51] Int. Cl.$^2$ ............................................... C08J 9/00
[52] U.S. Cl. ..................................... 521/125; 521/126
[58] Field of Search ............................... 521/125, 126

[56] References Cited

U.S. PATENT DOCUMENTS 3,342,757   9/1967   Considine ............................. 521/125
3,940,517   2/1976   DeLeon ................................ 521/125

Primary Examiner—Maurice J. Welsh
Attorney, Agent, or Firm—Kenneth G. Wheeless; Robert Spector

[57] ABSTRACT

The friability exhibited by urethane-modified isocyanurate foams prepared by reacting a polyfunctional isocyanate with a polyol at a ratio of isocyanate equivalents to moles of active hydrogen greater than 6:1 is reduced to an acceptable level using alkali metal salts in combination with certain organotin compounds or stannous salts as the catalyst.

5 Claims, No Drawings

METHOD FOR PREPARING URETHANE-MODIFIED ISOCYANURATE FOAMS

BACKGROUND OF THE INVENTION

This application is a continuation-in-part of application Ser. No. 797,445, filed May 16, 1977, which in turn is a continuation of application Ser. No. 613,964, filed Sept. 16, 1975, both of which are now abandoned.

FIELD OF THE INVENTION

The present invention pertains to rigid cellular foam compositions and in particular to rigid polyisocyanurate cellular compositions which have been modified by addition of polyurethane-producing monomers. More particularly, the present invention relates to the preparation of rigid cellular urethane-modified isocyanurate polymers catalyzed with a synergistic combination of isocyanurate trimerization catalysts.

PRIOR ART

The preparation of rigid cellular polyisocyanurate or urethane/isocyanurate polymers is generally achieved by reacting either a polyether- or polyester polyol with an organic polyisocyanate in the presence of a surfactant, a blowing agent and a suitable catalyst. In the preparation of these foams, the function of the catalyst is to accelerate formation of the cellular product, thereby making the process economical and efficient. While amine catalysts such as 2,4,6-(N,N-dimethylaminomethyl) phenol and hexahydrotriazines are effective, the use of these catalysts has been limited by the high concentration level required and the toxicity of these compounds. The commercial utility of alkali metal salts such as potassium 2-ethylhexoate has not been fully realized because foams prepared using these catalysts are often so friable that they exhibit little if any resistance to impact and abrasion. In some instances, this effect may be so severe that the foams crumble to a powder when subjected to even routine handling during their fabrication. U.S. Pat. No. 3,940,517 issued to Alberto De Leon discloses that when polyisocyanurate foams are prepared using an alkali metal carboxylate as the catalyst the ratio of equivalents of isocyanate groups to moles of active hydrogen present in the present in the polyol component should not exceed 6:1. Above this ratio the foam exhibits an undesirably high friability. Since the resistance of the foam to burning is directly proportional to the aforementioned ratio of isocyanate equivalents to moles of active hydrogen it would be desirable to employ the highest possible ratio consistent with an acceptable level of friability, which is usually considered to be no higher than about 60%.

It is an objective of this invention to define a class of catalysts for urethane-modified isocyanurate foams that permit the preparation of foams using a higher concentration of polyfunctional isocyanate relative to polyol than has heretofore been feasible using prior art catalysts.

It has not been found that this objective can be achieved using certain organic or inorganic tin compounds in combination with a specified class of alkali metal salts.

SUMMARY OF THE INVENTION

This invention provides an improved method for preparing urethane-modified isocyanurate foams by reacting a polyfunctional isocyanate with a polyol in the presence of a catalytically effective amount of a catalyst for the reaction, wherein the improvements comprise reacting from 6 to 14 equivalent weights of isocyanate for each equivalent of polyol and conducting the reaction in the presence of a catalyst composition consisting essentially of (1) an alkali metal salt exhibiting a general formula selected from the group consisting

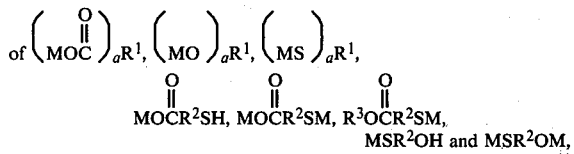

$$MOCR^2SH, MOCR^2SM, R^3OCR^2SM,$$
$$MSR^2OH \text{ and } MSR^2OM,$$

and (2) between 5 and 50%, based on the weight of said salt, of a tin compound exhibiting a formula selected from the group consisting of $R_b^4SnX_{(4-b)}$, $R_2^4SnS$, $R_2^4SnO$,

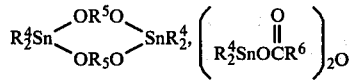

and $SnX_2$, wherein M is an alkali metal, a is 1 or 2, $R^1$ is alkyl containing between 1 and 20 carbon atoms, alkenyl containing between 2 and 20 carbon atoms, cycloalkyl, aryl, alkaryl or aralkyl when a is 1 or $R^1$ is alkylene, arylene or alkylidene and contains between 2 and 20 carbon atoms when a is 2, $R^2$ and $R^5$ each represent identical or different alkylene radicals containing between 2 and 20 carbon atoms, $R^3$, $R^4$ and $R^6$ are individually selected from the group consisting of alkyl radicals containing between 1 and 20 carbon atoms, cycloalkyl, aryl, alkaryl and aralkyl radicals, b is zero or the integer 1, 2 or 3 and X is selected from the group consisting of halogen atoms and radicals of the formula $R^7COO—$, $R^7S—$ and $R^7OOC(CH_2)_nS—$, wherein $R^7$ is selected from the same group as $R^3$ and n is 1 or 2.

DETAILED DESCRIPTION OF THE INVENTION

The two-component catalyst compositions of the present method make it possible to prepare urethane-modified isocyanurate foams exhibiting acceptable levels of friability from precursors wherein the ratio of isocyanate equivalents to polyol equivalents is from 6:1 to 14:1. Using prior art catalyst compositions it has not been feasible to achieve acceptable levels of friability at isocyanate to polyol ratios greater than about 6:1.

An additional advantage of the present catalyst compositions is that the time period required for completion of the polymerization reactions is significantly reduced relative to what can be achieved in the absence of the tin compound. This is considered surprising, since tin compounds are not effective catalysts for the trimerization of isocyanates, as will be demonstrated in the accompanying examples.

The concentration of tin compound in the present catalyst compositions depends upon a number of variables, including the particular polyisocyanate and polyol employed to prepare the cellular polymer. Conventionally the tin compound constitutes between 5 and 50% by weight of the catalyst composition, preferably between 10 and 30%.

The total catalyst concentration required for an acceptable foam product is between 0.5 and 5%, based on the weight of polyisocyanate present in the formulation employed to prepare the foam. The time required for the foam to completely rise is usually a direct function of the catalyst concentration, and is desirably between 5 and 300 seconds for a commercial process, depending upon the method of application and the thickness of the foam.

The first component of the present catalyst compositions is a reaction product of lithium, sodium or potassium hydroxide with a carboxylic acid, alcohol, phenol, mercaptoacid, mercaptoacid ester or mercaptoalcohol. In those instances when the anionic portion of the resultant salt is derived from a compound containing both hydroxyl and mercapto radicals, the reaction with the alkali metal hydroxide will usually occur at the hydrogen atom of the mercapto radical, since this atom is usually more labile than the hydrogen atom of the hydroxyl group. The latter can be reacted by using more than an equimolar amount of alkali metal hydroxide. The anionic portion of the resultant salt contains between 1 and 20 carbon atoms.

Carboxylic acid suitable for use in preparing the present salts include acetic acid, propionic acid, butyric acid, valeric acid, hexanoic acid, heptanoic acid or other acid up to and including $C_{20}$ carboxylic acids. Unsaturated carboxylic acids derived from tall oils or animal fats such as oleic acid or linoleic acids are also suitable, as are mixtures of these acids. Aromatic carboxylic acids such as benzoic acid and substituted derivatives thereof, such as p-nitrobenzoic acid, salicylic acid, and the isomeric naphthenoic acids may also be used. Polycarboxylic acids, such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydroxymuconic acid, $\beta$-hydroxymuconic acid, $\alpha$-butyl-$\alpha$-ethylglutaric acid, $\alpha,\beta$-diethylsuccinic acid, isophthalic acid, terephthalic acid, hemimellitic acid and 1,4-cyclohexane dicarboxylic acid can be reacted with a stoichiometric amount of an alkali metal hydroxide to form useful catalysts.

Instead of using a carboxylic acid to form the salt one can employ mercaptocarboxylic acids, esters of mercaptocarboxylic acids, phenols, alcohols, mercaptoalcohols or mercaptans as specified hereinbefore. Among these alternative precursors preferred compounds include mercaptoacetic acid, mercaptopropionic acid, isooctyl mercaptoacetate, 2-mercaptoethanol, phenol and substituted phenols wherein the substituents on the phenyl radical include halogen and nitro (—$NO_2$) radicals, methanol, ethanol and higher homologs thereof, ethylene and propylene glycol, lauryl mercaptan, benzyl mercaptan and thiophenol.

The aforementioned salt is prepared by neutralizing the carboxylic acid or other precursor with an aqueous solution of the alkali metal hydroxide. Careful control of the reaction mixture temperature during the exothermic neutralization reaction is usually required to maintain a colorless product. The water of solution and neutralization is then removed under reduced pressure with stirring to minimize heating.

An optional procedure employs a diluent as a viscosity suppressant and/or solvent for the reactants and products. In this procedure, the carboxylic acid or other precursor is first dissolved in the diluent, then reacted with the aqueous caustic solution. The water formed as a by-product is then removed. Suitable diluents for reacting carboxylic acids and compounds containing a mercaptan radical include alcohols such as methanol, ethanol, propanol, butanol, and the like; glycols such as ethylene glycol, diethylene glycol and poly(ethylene glycols), propylene glycol, dipropylene glycol and poly(propylene glycols) and the like.

The second component of the catalysts employed in the present method is a stannous or stannic salt of one of the aforementioned compounds employed to prepare the alkali metal salt or certain organotin compounds as specified hereinbefore. The organotin compounds include diorganotin oxides, sulfides and mono-, di- and triorganotin compounds derived from reaction of the corresponding organotin halide or oxide with a carboxylic acid, mercaptan or mercaptoacid ester. Diorganotin derivatives of glycols containing between 2 and 20 carbon atoms are also useful. Representative methyltin compounds include methyltin-S,S',S"-tris(isooctyl mercaptoaceta
Dimethyltin-S,S'-bis(isooctyl mercaptoacetate)
Trimethyltin-S-isooctyl mercaptoacetate
Methyltin-S,S',S"-tris(lauryl mercaptide)
Dimethyltin-S,S'-bis(lauryl mercaptide)
Dimethyltin distearate
Methyltin tri-2-ethylhexoate
Dimethyltin dibenzoate
Dimethyltin maleate
Dimethyltin dilaurate
Dimethyltin sulfide
Dimethyltin oxide
Bis(dimethyl lauryloxytin)oxide
Bis(dimethyltin)diethylene glycoxide,

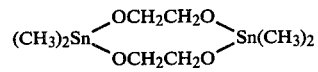

Homologs of all the foregoing organotin compounds wherein the hydrocarbon radical bonded to the tin atom is butyl, cyclohexyl, octyl or phenyl are readily available and are particularly suitable for use in the present catalyst compositions. Methods for preparing all of the present organotin catalysts from the corresponding organotin halide or oxide are reported in the literature and do not form part of this invention. In place of the foregoing organotin compounds one can employ a stannous or stannic salt of a mono- or dicarboxylic acid, mercaptan, mercaptoacid, mercaptoacid ester, alcohol or glycol. Suitable acids are of the formula $R^2COOH$, where $R^2$ represents a hydrocarbon radical containing between 1 and 20 carbon atoms as previously defined. Representative acids include acetic, propionic, butyric, isobutyric, pentanoic, caproic, 2-ethyl hexoic, caprylic, pelargonic, capric, dodecanoic, stearic, eicosanoic, oleic, cyclohexanecarboxylic, benzoic and toluic acids. The mixture of acids derived from tall oil is also suitable.

Tin compounds are not satisfactory catalysts for preparing cellular isocyanurate polymers, as will be demonstrated in the accompanying examples. It is therefore surprising that in addition to decreasing friability of the final product, the tin compounds often decrease the time required to form the cellular polymer relative to the time required using the aforementioned alkali metal salt alone.

The cellular urethane/isocyanurate polymers which are prepared in accordance with the method of this invention comprise the reaction product of an isocyanate with itself to form a polyisocyanurate, modified by the simultaneous reaction of a fraction of the polyisocyanate with a polyol containing at least two active hydrogen atoms, such as a hydroxy-terminated polyester, polyesteramide, polyamide or polyether or any other compound that will copolymerize with a polyisocyanate. Suitable comonomers include difunctional epoxide compounds, such as the diglycidyl ether of 1,4-butanediol and low molecular weight diglycidyl ethers or di- or bis- phenols.

In general, any polyol containing at least two active hydrogen atoms may be employed herein for reaction with the polyisocyanate to produce the necessary urethane modification of the isocyanurate polymer. Examples of suitable types of polyols include castor oil, hydroxy-containing polyesters, polyalkylene polyether polyols, hydroxy-terminated polyurethane polymers, polyhydric polythioethers, alkylene oxide adducts of phosphorus-containing salts, polyacetals, aliphatic polyols, simple, oligomeric and polymeric glycols such as ethylene glycol, propylene glycol, butylene glycol, poly(ethylene glycol), poly(propylene glycol) and poly(butylene glycol). These polyols generally have an average equivalent weight of from about 31 for ethylene glycol to 2000 for a polyoxypropylene adduct of glycerine. Polyol blends, such as a mixture of high molecular weight polyether polyols with lower molecular weight polyether polyols or monomeric polyols, can also be used to achieve a desired level of viscosity.

The organic polyisocyanates which are advantageously employed either alone or as mixtures in the present invention can be represented by the formula:

$$R(NCO)_z$$

wherein R is a polyvalent organic radical selected from the group of alkyl, aryl, aralkyl and alkaryl organic radicals and z is an integer corresponding to the valence number of R and is at least 2. Representative organic polyisocyanates contemplated herein include, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as tris-(4-isocyanatophenyl)methane; 2,4,6-toluene trisisocyanates; the aromatic tetraisocyanates, such as 4,4'-dimethyldiphenylmethane-2,2', 5',5'-tetraisocyanate, and the like; alkylaryl polyisocyanate, such as xylene diisocyanate; aliphatic polyisocyanates, such as hexamethylene-1,6-diisocyanate; lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl4,4-'biphenyl diisocyanate, and 3,3'-dimethyldiphenylmethane-4,4'-diisocyanate.

These polyisocyanates are prepared by conventional methods known in the art such as phosgenation of the corresponding organic amine.

In the practice of the present invention, the preferred isocyanate is polymethylene polyphenylisocyanate. The relative amount of this polyisocyanate present in the reaction mixture should be such that the number of equivalent weights of isocyanate groups is from 6 to 14, preferably from 10 to 14 times the total number of moles of active hydrogen atoms present in the reaction mixture.

In addition to the previously disclosed isocyanate and polyol reagents useful in the preparation of the foam product, other ingredients such as surfactants and blowing agents are also included. Conventional surfactants used for preparing cellular polyisocyanurates include reaction products of polysiloxanes and alkylene oxides such as ethylene oxide and propylene oxide. The surfactant is generally used in an amount ranging from about 0.01 part to 5 parts by weight per hundred parts of the polyfunctional isocyanate.

Formation of the cellular structure that characterizes isocyanurate foams is accomplished by use of a blowing agent, a volatile organic liquid which vaporizes during the exothermic polymerization reaction. Conventional blowing agents include halogen-containing hydrocarbons such as methylene chloride, ethylene chloride, trichlorofluoromethane, dichlorodifluoromethane, chlorotrifluoromethane, tetrachloromethane and difluorotetrachloroethane. One of the preferred blowing agents is trichlorofluoromethane. Water may be used as a supplemental blowing agent in addition to the halocarbon. The use of water as a blowing agent in urethane chemistry is described in Saunders and Frisch, Advances in Polyurethane Chemistry, Volume 1, Page 76.

Other ingredients conventionally present in polyurethanes and urethane-modified isocyanurate polymers include fillers and pigments. Conventional fillers for foams include, for example, aluminum silicate, calcium silicate, magnesium silicate, calcium carbonate, barium sulfate, calcium sulfate, carbon black and silicon. The filler is usually present in an amount ranging from about 5 parts to 50 parts by weight per hundred parts of total formulation employed to prepare the foam.

Pigments that have been employed in foam products include titanium dioxide, zinc oxide, oxides of iron, antimony oxide, chrome green, chrome yellow, iron blue siennas, molybdate oranges, organic pigments such as "para" reds, benzidine yellow, toluidine red, various toners and phthalocyanine dyes.

Many procedures conventionally employed to prepare rigid urethane foams are also applicable to urethane-modified isocyanurate polymers. These procedures usually involve combining the reagents and additives other than the polyisocyanate with rapid agitation to ensure a homogeneous formulation. The resultant composition is then thoroughly blended with the polyisocyanate after which it is poured into a suitable mold or other container wherein the simultaneous polymerization and expansion or "blowing" occurs. The proper balance between the rates of polymerization and expansion of the resultant polymer must be achieved to obtain a uniform product that exhibits the desired low density and small cell size.

The following example discloses preferred embodiments of the present method and should not be interpreted as limiting the scope thereof. All values expressed in parts are by weight.

The friability of foam samples prepared using both the present and prior art catalysts was determined using ASTM (American Society for Testing of Materials) test procedure C421-71, entitled "Mechanical Stability of Preformed Thermal Insulation by Tumbling". The friability is expressed in terms of the relative weight loss (in percent), based on the initial weight of the sample measured prior to testing, that occurs throughout a ten minute interval during which the sample is in a rotating cubicle containing a number of loose oak cubes measuring 1 inch along each edge. Friable samples crumble readily under these conditions.

methylene polyphenylisocyanate. The resultant mixture was stirred rapidly for 10 seconds, then poured into a suitable cardboard container and allowed to rise. The time intervals between combining of the reagents and (1) the onset of blowing (as evidenced by an opacifying of the mixture) and (2) the completion of rising of the foam were measured and are referred to as cream time and rise time, respectively, in the accompanying table.

| | SAMPLE NUMBER | | | | | | | |
|---|---|---|---|---|---|---|---|---|
| | 1 | 2 | 3 | 4 | 5 | 6 | 7 | 8 |
| $Cl_3CF$ (g.)[1] | 30.0 | 25.0 | 23.0 | 23.0 | 30.0 | 30.0 | 30.0 | 23.0 |
| Catalyst (g.) | | | | | | | | |
| 2,4,6-tris(dimethylamino-methyl)phenol (control) | 12.5 | | | | | | | |
| potassium-2-ethylhexoate (50% solution in polyoxypropylene glycol) | | 1.5 | 2.5 | | 1.5 | 1.5 | 1.5 | |
| $(CH_3)_2Sn(SCH_2COO\text{-}iso\text{-}C_8H_{17})_2$ | | | | 11.4 | 0.25 | | | |
| $(n\text{-}C_8H_{17})_2Sn(SCH_2COO\text{-}iso\text{-}C_8H_{17})_2$ | | | | | | | 0.25 | |
| $[(n\text{-}C_4H_9)_2SnOOCC_{11}H_{23}]_2O$ | | | | | | | | |
| $(n\text{-}C_4H_9)_2Sn[OOC(CH_2)_{10}CH_3]_2$ | | | | | | | | 3.0 |
| $(n\text{-}C_4H_9)_2Sn(SC_{12}H_{25})_2$ | | | | | | | | |
| $(C_4H_9)_2Sn\overset{OCH_2CH_2O}{\underset{OCH_2CH_2O}{\diagup\diagdown}}Sn(C_4H_9)_2$ | | | | | | | | |
| stannous-2-ethylhexoate | | | | | | | | |
| $n\text{-}C_4H_9Sn(SCH_2COO\text{-}iso\text{-}C_8H_{17})_3$ | | | | | | | | |
| $(CH_2\!=\!CHCH_2)_2Sn(SCH_2COO\text{-}iso\text{-}C_8H_{17})_2$ | | | | | | | | |
| Cream Time (seconds) | 12 | 12 | 8 | 10 | 10 | 8 | 8 | 30 |
| Rise Time (seconds) | 325 | 100 | 38 | —[2] | 60 | 70 | 60 | 64[2] |
| Friability, (% weight loss following 10 minutes of tumbling) | 35 | 94 | 92 | —[2] | 35 | 50 | 59 | —[2] |
| Density of foam (lbs./ft$^3$) | 1.76 | 1.64 | 1.69 | —[2] | 1.47 | 1.35 | 1.45 | —[2] |

| | 9 | 10 | 11 | 12 | 13 | 14 | 15 |
|---|---|---|---|---|---|---|---|
| $Cl_3CF$ (g.)[1] | 30.0 | 30.0 | 30.0 | 20 | 20 | 20 | 20 |
| Catalyst (g.) | | | | | | | |
| 2,4,6-tris(dimethylamino-methyl)phenol (control) | | | | | | | |
| potassium-2-ethylhexoate (50% solution in polyoxypropylene glycol) | 1.5 | 1.5 | 1.5 | 1.5 | 1.125 | 1.5 | 1.5 |
| $(CH_3)_2Sn(SCH_2COO\text{-}iso\text{-}C_8H_{17})_2$ | | | | | | | |
| $n\text{-}C_4H_9)_2Sn(SCH_2COO\text{-}iso\text{-}C_8H_{17})_2$ | | | | | | | |
| $(n\text{-}C_8H_{17})_2Sn(SCH_2COO\text{-}iso\text{-}C_8H_{17})_2$ | | | | | | | |
| $[(n\text{-}CH_4H_9)_2SnOOCC_{11}H_{23}]_2O$ | | | | | 0.375 | | |
| $(n\text{-}C_4H_9)_2Sn[OOC(CH_2)_{10}CH_3]_2$ | 0.25 | | | | | | |
| $(n\text{-}C_4H_9)_2Sn(SC_{12}H_{25})_2$ | | 0.25 | | | | | |
| $(C_4H_9)_2Sn\overset{OCH_2CH_2O}{\underset{OCH_2CH_2O}{\diagup\diagdown}}Sn(C_4H_9)_2$ | | | | | | | 0.25 |
| stannous-2-ethylhexoate | | | | 0.25 | | | |
| $n\text{-}C_4H_9Sn(SCH_2COO\text{-}iso\text{-}C_8H_{17})_3$ | | | | | 0.5 | | |
| $(CH_2\!=\!CHH_2)_2Sn(SCH_2COO\text{-}iso\text{-}C_8H_{17})_2$ | | | | | | 0.5 | |
| Cream Time (seconds) | 9 | 8 | 8 | 13 | 14 | 14 | 10 |
| Rise Time (seconds) | 100 | 80 | 90 | 80 | 120 | 85 | 110 |
| Friability,(% weight loss following 10 minutes of tumbling) | 42 | 54 | 50 | 48 | 53 | 75 | 48 |
| Density of foam (lbs./ft.$^5$) | 1.45 | 1.46 | 1.30 | 2.14 | 2.46 | 1.80 | 2.09 |

[1]Concentration of blowing agent ($Cl_3CF$) was varied to obtain the desired level of foam density.
[2]Foam did not rise completely.

EXAMPLE

To a homogeneous mixture containing 22.5 g of a polyoxypropylene glycol exhibiting a hydroxyl number of 425 (available as Pluracol ® P-410 from BASF Wyandotte Corporation) and 2.5 g of a polyoxyalkylene polysiloxane surfactant (available as Niax silicone L-5340 from the Union Carbide Corporation) were added trichlorofluoromethane and a catalyst as disclosed in the accompanying table, followed by 100 g of poly- The data in the preceding table demonstrate that while tin compounds alone are ineffective catalysts for preparing cellular urethane/isocyanurate polymers, these compounds interact favorably with alkali metal salts of carboxylic acids to increase the structural strength of the cellular polymers. The tin compounds also decrease the cream and rise time of the foam, which is unexpected in view of their poor catalytic activity when employed in the absence of the alkali metal salt.

What is claimed is:

1. In an improved method for preparing urethane-modified isocyanurate foams by reacting a polyfunctional isocyanate with a polyol in the presence of a catalytically effective amount of a catalyst for the reaction, wherein the improvements comprise reacting from 6 to 14 equivalent weights of said polyfunctional isocyanate for each equivalent of polyol and conducting the reaction in the presence of a catalyst composition consisting essentially of (1) an alkali metal salt exhibiting a general formula selected from the group consisting of

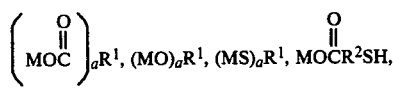

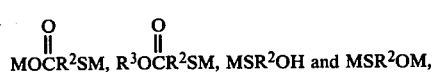

and (2) between 5 and 50%, based on the weight of said salt, of a tin compound exhibiting a formula selected from the group consisting of

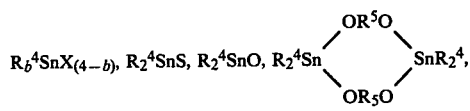

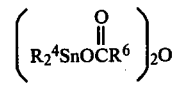

and $SnX_2$, wherein M is an alkali metal, a is 1 or 2, $R^1$ is alkyl containing between 1 and 20 carbon atoms, alkenyl containing between 2 and 20 carbon atoms, cycloalkyl, aryl, alkaryl or aralkyl when a is 1 or $R^1$ is alkylene, arylene or alkylidene and contains between 2 and 20 carbon atoms when a is 2, $R^2$ and $R^5$ each represent identical or different alkylene radicals containing between 2 and 20 carbon atoms, $R^3$, $R^4$ and $R^6$ are individually selected from the group consisting of alkyl radicals containing between 1 and 20 carbon atoms, cycloalkyl, aryl, alkaryl and aralkyl radicals, b is zero or the integer 1, 2 or 3 and X is selected from the group consisting of halogen atoms and radicals of the formula $R^7COO-$, $R^7S-$ and $R^7OOC(CH_2)_nS-$, wherein $R^7$ is selected from the same group as $R^3$ and n is 1 or 2.

2. A method according to claim 1 wherein M is potassium and a is 1.

3. A method according to claim 2 wherein the salt exhibits the formula

4. A method according to claim 3 wherein $R^1$ represents a 2-ethylhexyl.

5. A method according to claim 1 wherein $R^4$ represents methyl, butyl, octyl or phenyl.

* * * * *